United States Patent
Das Sharma et al.

(10) Patent No.: US 9,372,752 B2
(45) Date of Patent: Jun. 21, 2016

(54) ASSISTED COHERENT SHARED MEMORY

(71) Applicant: Intel Corporation, Santa Clara, CA (US)

(72) Inventors: Debendra Das Sharma, Saratoga, CA (US); Mohan J. Kumar, Aloha, OR (US); Balint Fleischer, Groton, MA (US)

(73) Assignee: Intel Corporation, Santa Clara, CA (US)

( * ) Notice: Subject to any disclaimer, the term of this patent is extended or adjusted under 35 U.S.C. 154(b) by 141 days.

(21) Appl. No.: 14/142,726

(22) Filed: Dec. 27, 2013

(65) Prior Publication Data

US 2015/0186215 A1    Jul. 2, 2015

(51) Int. Cl.
*G06F 11/00*  (2006.01)
*G06F 11/10*  (2006.01)
*G06F 11/20*  (2006.01)
*G06F 12/08*  (2016.01)
*G06F 15/16*  (2006.01)

(52) U.S. Cl.
CPC ........ *G06F 11/1088* (2013.01); *G06F 11/2043* (2013.01); *G06F 11/2087* (2013.01); *G06F 11/2092* (2013.01); *G06F 11/2097* (2013.01); *G06F 12/08* (2013.01); *G06F 12/0837* (2013.01); *G06F 15/16* (2013.01); *G06F 11/108* (2013.01); *G06F 12/0833* (2013.01)

(58) Field of Classification Search
USPC .................................................. 714/6.2, 6.1
See application file for complete search history.

(56) References Cited

U.S. PATENT DOCUMENTS

| | | | | |
|---|---|---|---|---|
| 6,959,372 | B1* | 10/2005 | Hobson | G06F 9/445 711/168 |
| 7,975,109 | B2* | 7/2011 | McWilliams | G06F 12/0284 711/141 |
| 2001/0052054 | A1* | 12/2001 | Franke | G06F 12/1458 711/147 |
| 2004/0093463 | A1* | 5/2004 | Shang | G06F 11/1076 711/113 |
| 2007/0011272 | A1* | 1/2007 | Bakke | G06F 9/5027 709/217 |
| 2008/0307253 | A1* | 12/2008 | Bartley | G06F 11/2017 714/6.12 |
| 2014/0281243 | A1* | 9/2014 | Shalf | G06F 12/0813 711/122 |

FOREIGN PATENT DOCUMENTS

| | | |
|---|---|---|
| JP | 07152640 A | 6/1995 |
| JP | 2001142731 A | 5/2001 |
| JP | 2006252545 A | 9/2006 |
| JP | 2013140445 A | 7/2013 |

\* cited by examiner

*Primary Examiner* — Sarai Butler
(74) *Attorney, Agent, or Firm* — International IP Law Group, P.L.L.C.

(57) ABSTRACT

An apparatus for coherent shared memory across multiple clusters is described herein. The apparatus includes a fabric memory controller and one or more nodes. The fabric memory controller manages access to a shared memory region of each node such that each shared memory region is accessible using load store semantics, even in response to failure of the node. The apparatus also includes a global memory, wherein each shared memory region is mapped to the global memory by the fabric memory controller.

19 Claims, 5 Drawing Sheets

ASSISTED COHERENT SHARED MEMORY

TECHNICAL FIELD

This disclosure relates generally to a multi-node system. More specifically, the disclosure relates to sharing memory within a multi-node system.

BACKGROUND ART

A multi-node system may include a plurality of nodes. The type of system includes, but is not limited to, a network, a rack server system, a blade server, and the like. In some cases, each node may be a large symmetric multi-processing (SMP) node spanning a substantial portion of one or multiple racks with hardware cache coherency between the processing or input/output (I/O) devices in the node. As a result of the cache coherency, large SMP systems can apply sufficient compute resources to solve a problem with fine-grained load balancing between the computing devices, while having a large memory footprint to store application data which is directly accessible through memory load and store semantics by any compute device. The system may also be a loosely coupled (LC) system, comprising of multiple smaller SMP systems, where the nodes can coordinate the tasks at a coarse grain level.

BRIEF DESCRIPTION OF THE DRAWINGS

The following detailed description may be better understood by referencing the accompanying drawings, which contain specific examples of numerous objects and features of the disclosed subject matter.

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

An SMP system includes a single fault domain, where a fault in any component or software piece of the system causes the entire system to fail. For example, if a SMP node fails, the entire system including the SMP node fails. Conversely, an LC system will contain the failure of any component or software piece through independent fault domains. Thus, the affected server or component in an LC system may crash, but other servers or components will continue to operate as if the failure had not occurred. However, memory in an LC system is not shared through load/store semantics. Rather, messages are sent through an I/O driver to accomplish memory sharing in an LC system. The use of the I/O driver to enable memory sharing can lower performance of the LC system when compared to SMP systems due to higher latency associated with I/O drivers.

Embodiments described herein relate to coherent shared memory across multiple clusters. In embodiments, a fabric memory controller is coupled with one or more nodes. The fabric memory controller manages access to memory modules within each node using load store semantics. The memory module on each node made be included within a shared memory region of each node. The shared memory regions are accessible even when the node has failed. Moreover, the fabric memory controller manages a global memory and each shared memory region of a plurality of nodes may be mapped to the global memory by the fabric memory controller. As a result, a cacheable global memory is provided. The cacheable global memory is capable of delivering data consistency across multiple nodes and clusters, while maintaining independent fault domains of each node or cluster. Further, the global memory is accessible and cacheable using the load-store semantics as local memory while each cluster maintains its separate fault domain. Additionally, the shared memory is capable of providing reliability, availability, and serviceability (RAS) functionality, including all redundant array of independent disks (RAID) schemes. The present techniques may also be used with any high density rack scale architecture (RSA).

In embodiments, each node includes one or more processing devices (e.g., CPUs), memory that is cacheable as well as un-cacheable and volatile as well as non-volatile, and one or more I/O devices running one BIOS image as well as one Operating System/Virtual Machine Monitor image. In this manner, each node is a contained fault domain. Any failure in any hardware component in the node or in the software running on a node in the worst case only brings down that node.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other. However, the term "loosely coupled" refers to a system with independent fault domains. As a result, the use of the term "coupled" does not change or modify what is known as a loosely coupled system.

Some embodiments may be implemented in one or a combination of hardware, firmware, and software. Some embodiments may also be implemented as instructions stored on a machine-readable medium, which may be read and executed by a computing platform to perform the operations described herein. A machine-readable medium may include any mechanism for storing or transmitting information in a form readable by a machine, e.g., a computer. For example, a machine-readable medium may include read only memory (ROM), random access memory (RAM), magnetic disk storage media, optical storage media, flash memory devices, among others.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the inventions. The various appearances of "an embodiment," "one embodiment," or "some embodiments" are not necessarily all referring to the same embodiments. Elements or aspects from an embodiment can be combined with elements or aspects of another embodiment.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

Figure 1:
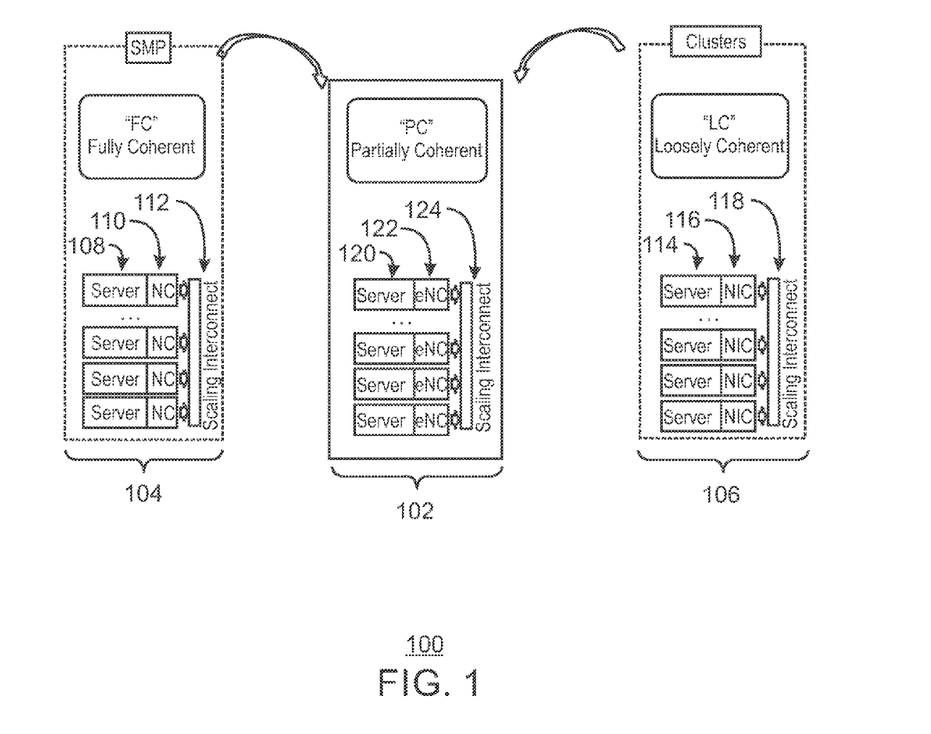
FIG. 1 is a block diagram of multi-node system models.

FIG. 1 is a block diagram 100 of multi-node system models. The multi-node system models include a partially coherent system 102, an SMP system 104, and an LC system 106. Although several servers are illustrated in each system, each system may be considered one server. In the SMP system 104, each node 108 is connected to a node controller (NC) 110. The NC 110 enables each node 108 to connect to a scaling interconnect 112. The scaling interconnect 112 may be used to enable communication between each NC 110 of the SMP system 104. Accordingly, the SMP system 104 is node controller based with a shared memory. The SMP system is fully coherent, and includes a fast distributed lock manager. However, the SMP system 104 is a single fault domain. In other words, a single fault occurring in any node 108 or node controller 110 will cause the entire system to fail, crash, or be otherwise unavailable.

In the LC system 106, each node 114 is connected to a network interface card (NIC) 116. In some cases, the NIC 116 is a remote direct memory access (RDMA) capable Ethernet device or another I/O controller, such as an InfiniBand Host Bus Adapter (IB HBA). The NIC 116 enables each node 114 to connect to an RDMA interconnect 118. The RDMA interconnect 118 enables each NIC 116 to pass messages in order to enable memory sharing across the LC system 106. Accordingly, the LC system 106 includes independent fault domains. However, memory is not shared in the LC system 106. Further, it is difficult to balance loads across the LC system 106 and the LC system 106 has a distributed lock manager scalability.

The partially coherent system 102 includes a plurality of nodes 120 each connected to one of a plurality of enhanced node controllers (eNC) 122. Each eNC 122 connects its respective node 120 to a scaling interconnect 124. The partially coherent system 102 shares memory across the multi-node system with independent fault domains. The partially coherent system 102 is partially coherent through the use of a software assist as described below. Additionally, the partially coherent system 102 includes a fast distributed lock manager.

Figure 2:
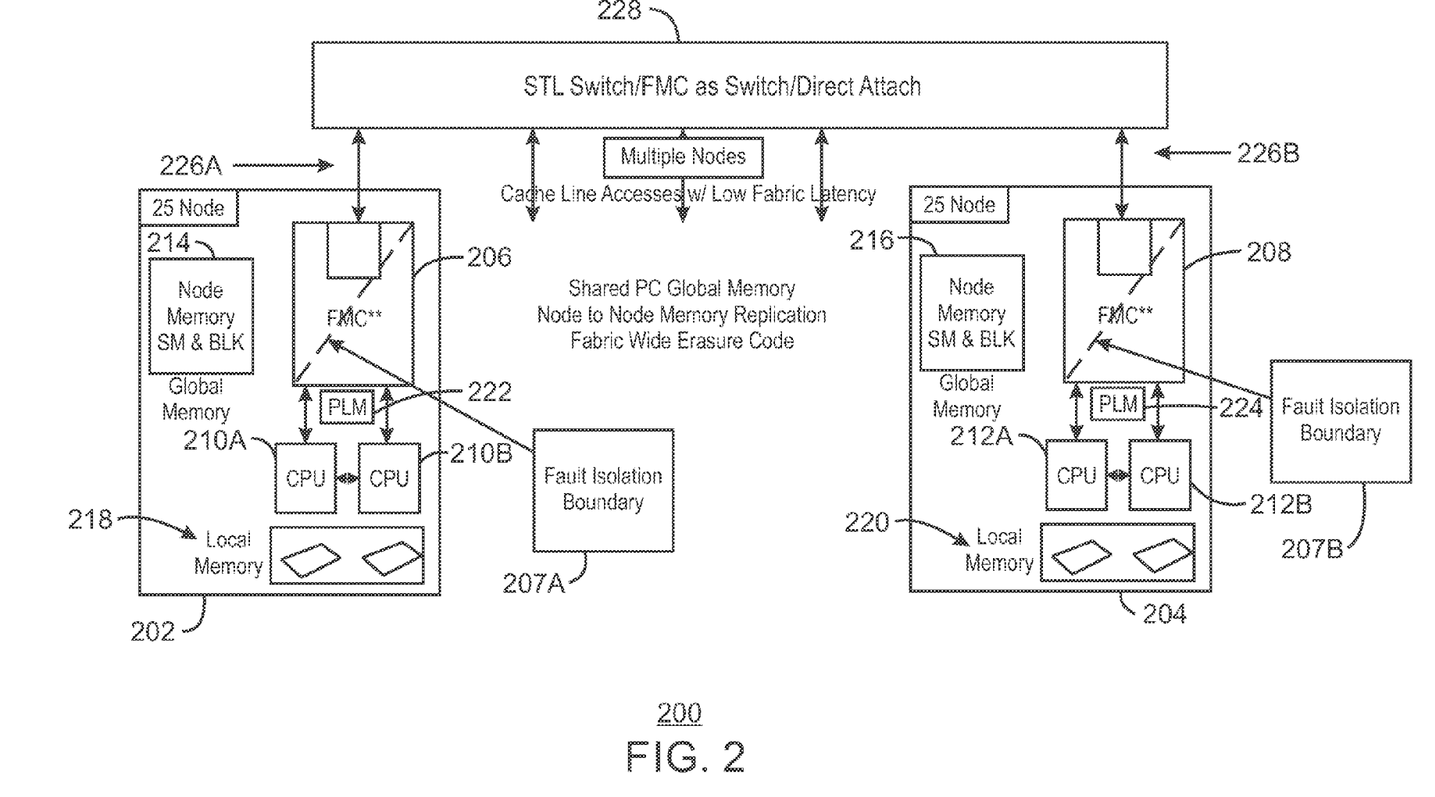
FIG. 2 is an illustration of the partially coherent system.

FIG. 2 is an illustration of the partially coherent system 102. The partially coherent system 102 includes a node 202 and a node 204. The node 202 includes a fabric memory controller (FMC) 206, and the node 204 includes an FMC 208. Additionally, the node 202 includes a node memory 214 and a local memory 218. The node 204 includes a node memory 216 and a local memory 220. Each FMC 206 and 208 may be a discrete component with their respective node as illustrated in FIG. 2. In some embodiments, the FMCs 206 and 208 may be integrated into the CPU(s) within each node of the multi-node system. Accordingly, in some embodiments the FMC 206 may be integrated into the CPU 210A and the CPU 210B of the node 202, and the FMC 208 may be integrated into the CPU 212A and the CPU 212B of the node 204. The CPUs 210A, 210B, 212A, and 212B each access a global memory using a PLM (Plattsmouth) protocol which is a combination of memory semantics (for the system memory map) similar to SMI3 and the I/O protocol (such as PCIe) for block-type memory access. The global memory includes the node memory 214 and the node memory 216. In embodiments, the global memory may be accessed as a shared memory or a block memory. The global memory may be divided into multiple regions. Additionally, the FMC 206 and the FMC 208 implement a fault isolation boundary 207A and a fault isolation boundary 207B, respectively, where the global memory can be accessed by other nodes even when its local node is down.

A Plattsmouth (PLM) Link may be used to connect each CPU to the FMC. Accordingly, the node 202 includes a pair of PLM links 222 to connect the CPU 210A and the CPU 210B to the FMC 206. Similarly, the node 204 includes a pair of PLM links 224 to connect the CPU 212A and the CPU 212B to the FMC 208. A PLM link 226A and a PLM link 226B may also be used to connect the node 202 and the node 204, respectively, to switch 228. Each PLM link is capable of supporting both memory semantics with optional directory information such as SMI3 and an I/O protocol with load and store functionality, such as a Peripheral Component Interconnect Express (PCIe) protocol. In embodiments, any link that can support memory semantics and an I/O protocol using a common set of pins can be used to connect a node to an SMC. Moreover, any link that can support memory semantics and an I/O protocol using a common set of pins can be used to connect a CPU to an FMC. Additionally, the PLM links may be implemented using the physical layer of the PCIe architecture.

The global memory may the accessed via the switch 228. The switch 228 may be used to connect multiple FMCs from a plurality of nodes within a multiple node system. In some cases, the switch 228 may be a Stormlake (STL) switch, another FMC used as a switch, or a direct attach mechanism. The switch may be used to route requests for global data between the one or more nodes. In any event, the switch 228 is used to pass low latency message semantics across the global memory. In embodiments, the multiple FMCs are connected to each other either directly using PLM Links or through another FMC switch. Moreover, in embodiments multiple FMCs may be connected by tunneling the PLM protocol over a networking stack like STL through an STL switch.

As a result of the FMCs of a plurality of nodes connected via a switch and PLM links, the global memory is shared and can be accessed via load store semantics. For computations local to a node, the node may access its own reserved memory for those computations. The global memory that resides on a plurality of nodes may have the same characteristics memory, and each node can perform operations on this memory. Additionally, nodes can be assigned to particular pieces of the global memory through policies, and the policies may be maintained by each node or the switch that connects the FMCs of the plurality of nodes.

Instead of passing messages through an RMDA, load store semantics are used to communicate between nodes though the FMC. Each FMC implements a fault isolation boundary where even if the CPUs of the node fail, the global memory of each node may be accessed through the FMC. As discussed above, the shared memory may be accessible through a STL networking stack or the PLM link. Each FMC of the plurality of nodes may pass messages between the nodes using load/store semantics, but does not tie up traffic of the plurality of nodes.

The fault isolation boundaries of an FMC may be implemented using various techniques. In some embodiments, hardware is used to ensure that each CPU is independent from other CPUs within the same node and system. In this manner, the failure of independent CPUs does not affect the operation of other CPUs. In other embodiments, the failure of a CPU may cause other CPUs to fail, however, the global memory within the failed node may be powered on and active such that the node can fail without affecting the processing of other nodes, and the memory of the failed node remains accessible.

Figure 3:
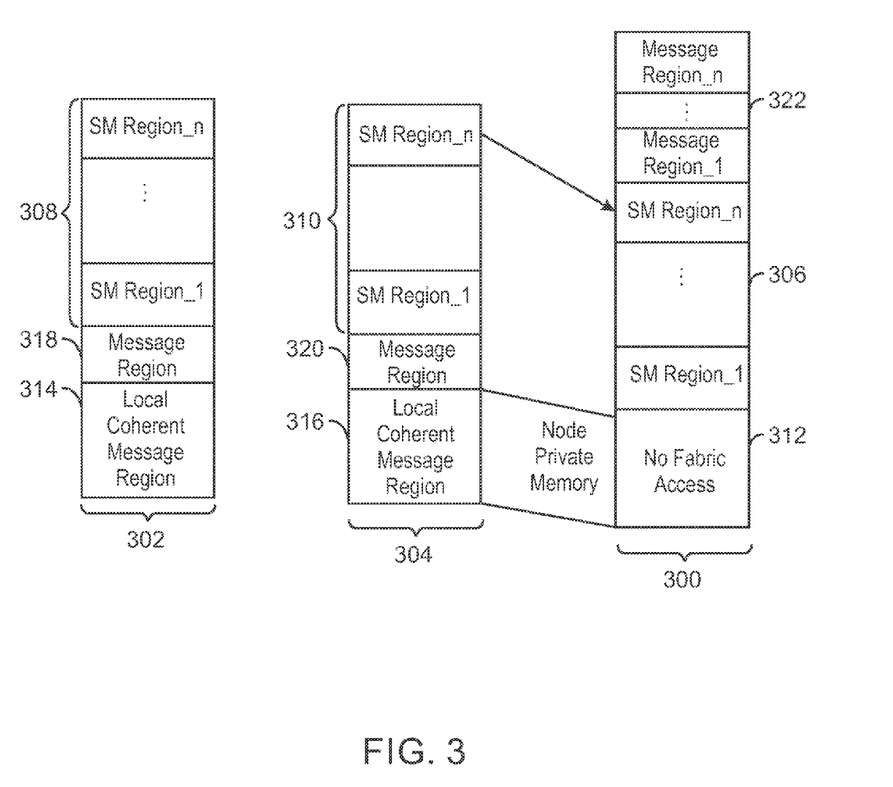
FIG. 3 is an illustration of a global memory map.

FIG. 3 is an illustration of a global memory map 300. The global memory map 300 is illustrated as viewed by the one or more FMCs that act as a router or switch to coordinate the access to global memory across the nodes. Portions of the global memory map may be stored on a node 302 and a node 306. The global memory may be divided into multiple shared memory regions 306. The global memory may be managed by an FMC as illustrated in FIG. 2. Accordingly, each node 302 and node 306 of the global memory are mapped into the global memory as illustrated by the global memory map 300 by the FMC. In particular, a shared memory region 308 of the node 302 may include any number of shared memory regions, ranging from 1 to n. A shared memory region 310 of the node 304 may include another number of shared memory regions, ranging from 1 to p. The global memory then includes shared memory region 308 ranging from 1 to n, and shared memory region 310 ranging from 1 to p. Each shared memory region may be physically attached to one FMC or may be striped across multiple FMCs. Moreover, the size of the memory regions may be variable or fixed. In embodiments, the each region may be maintained at a page-level granularity, such that an entire memory region can be paged as part of a memory management scheme. As illustrated in FIG. 2, each node may include a local memory that is not accessible by the FMC, and is not represented by the global memory map 300. The global cluster memory map 300 includes a portion 312 recognizes a local coherent memory region 314 and a local coherent memory region 316 as each individual node's private memory that is not accessible through the load-store fabric.

The local coherent memory regions 314 and 316 may be used as a message region. Accordingly, each of the local coherent memory regions 314 and 316 includes a message region 318 and a message region 320, respectively. While the local message region 318 and the message region 320 are not directly accessible by an FMC acting as a switch or router to share memory across the nodes, the FMC may indirectly access the message region 322.

The shared memory region 308 and the shared memory region 310 are visible to each of the nodes with the same address range as the global cluster memory map 300. Each shared memory region may have different access rights for each set of nodes. The access rights may be based on a set of policies. Moreover, each shared memory region's address range as well as any access rights are enforced by a set of range registers. In some cases, each shared memory region's address range and access rights may be implemented by a page-table that is resident in the memory if the regions are (super)pages in the FMC(s). The global memory is cacheable in any node, if the node has the appropriate access rights. However, the one or more FMCs that manages the global memory may not enforce a hardware based cache coherence mechanism between the nodes. Instead, the data coherence is enforced by software running on each of the nodes.

The message region 318 and the message region 320 can be used to ensure data coherency across the node 302 and the node 304. Each node can broadcast a message to the other nodes that have access to a particular portion of memory and request information regarding the status of the particular portion of memory. For example, a first node can request that any node with data belonging to a particular region of memory update that region of memory if it has data belonging to that region of memory. Any node that has that region of memory can respond to the message and inform the requesting first node that the region of memory has been updated and replaced. In some cases, the passing of messages to access the global memory is a software based handshake that is a direct memory access and does not use an I/O stack to access the data.

The global memory can include an agreement on which nodes can take and update the data in the global memory, there exists a clustering model of memory with handshaking between the nodes. Additionally, the FMCs can ensure the appropriate access rights for each node, as well as provide access to the data of any node that has died. This access occurs using load/store semantics and hardware, without the delay of an I/O software stack. Moreover, the memory can be accessed like a flat memory, in a linear fashion, per bytes, rather than a block access. In some cases, the shared memory regions are cacheable. Further, in some cases, the message regions can be used to pass data between nodes instead of using the FMCs to pass messages regarding data stored on the nodes.

Figure 4:
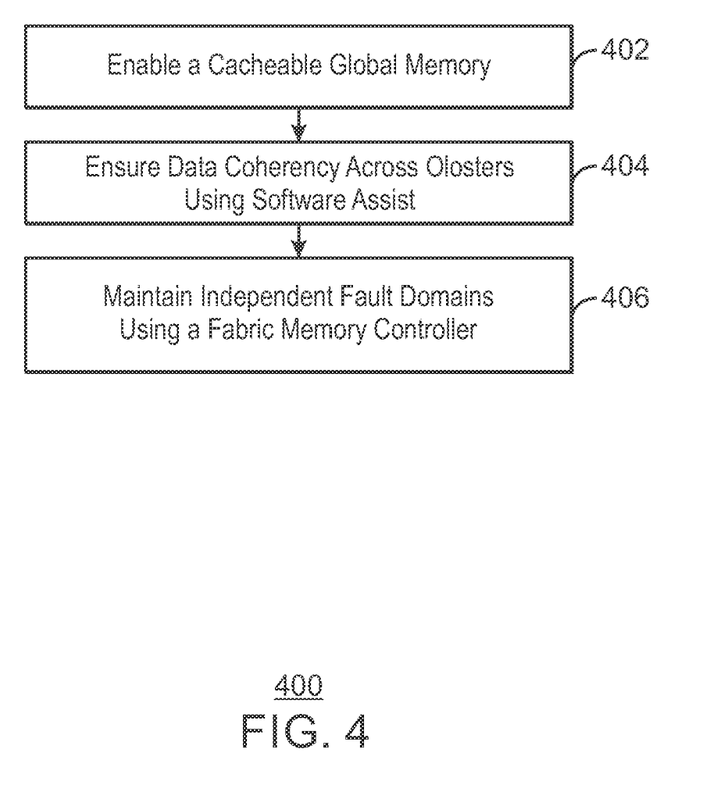
FIG. 4 is a process flow diagram for coherent shared memory across multiple clusters.

FIG. 4 is a process flow diagram 400 for coherent shared memory across multiple clusters. At block 402, a cacheable global memory is built. In some cases, the cacheable global memory is enabled using shared memory regions across multiple clusters, wherein the shared memory regions are accessible using load store semantics. At block 404, data coherency is ensured across multiple clusters using a software assist mechanism. At block 406, independent fault domains are maintained for each cluster through the use of a fabric memory controller.

In some embodiments, the fabric memory controller is used to enable Reliability Availability Serviceability (RAS) features across the multi-node system. In order to be enterprise-ready, the FMC supports memory replication, such as various forms of RAIDs across other FMCs. In this manner, the ability to reconstruct the contents of the replicated memory if an FMC or its associated global memory goes down is enabled. The replication may be a K-aryl replication, where every write is replicated in (k−1) additional copies. The address map range register (or the page table) stores the primary location along with the back-up location(s). In the case of RAID schemes, the host FMC maintains the other addresses and FMCs that are Raided together. The FMC hosting the primary location replicates the write in each of FMC(s) hosting the back-up location(s). In the case of RAID'ed configurations, the hosting FMC sends the ex-or information to the RAID locations storing the parity.

On a write, the FMC that is the primary for the address location being written sends the writes to the back-up locations. In some embodiments, the FMC sends the writes to the RAID ex-or location for the FMC(s) storing the parity. The backup FMCs send the write completion back to the primary FMC. Even though the writes are posted, until all the writes are completed, the write is not deemed to be completed in the primary FMC. The primary FMC maintains a timer for each of the other FMC(s) that it sends the write. If the completion is not received from each destination FMC, the primary FMC may time out. Moreover, the primary FMC may try to redo the transaction using an alternate path and/or informs the system software to take the necessary recovery action.

A read may be serviced by either the primary FMC or a back-up FMC if replication is enabled. The FMC that attaches to the node generating the read request maintains a timer. If the completion is not received by the time-out, it may try an alternate path to the same FMC or a back-up FMC for some pre-determined number of times. If the transaction still times out, it may poison the data return. The FMC may also report the timeout error to the system software to take the necessary corrective action or simply log the error. In embodiments, if an FMC or a memory module attached to an FMC fails, the contents can be transferred to another FMC with spare capacity and the range registers (or page table entries) updated accordingly.

Figure 5:
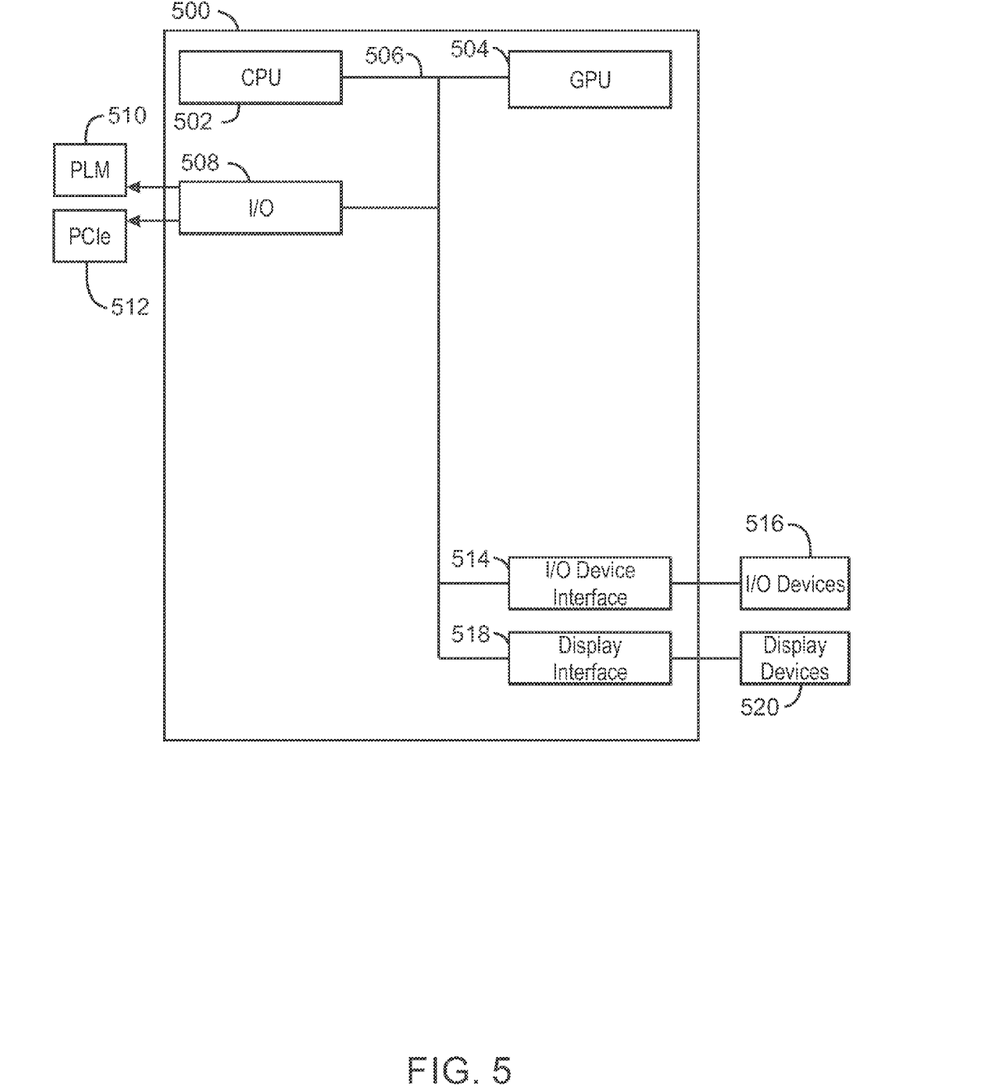
FIG. 5 is a block diagram of a node 500 that may access pooled memory resources.

FIG. 5 is a block diagram of a node 500 that may access pooled memory resources. The node 500 may be, for example, a laptop computer, desktop computer, tablet computer, mobile device, server, or blade server, among others. The node 500 may also be a node within any high density rack scale architecture (RSA). In some examples, a node is any device that is capable of communicating across the multi-node system to another node. Accordingly, in some examples, the multi-node system is a network of nodes, where each node is any device capable of communicating across the network. Additionally, in some examples, the multi-node is a server in a rack server system.

The node 500 may include a central processing unit (CPU) 502 that is configured to execute stored instructions. The CPU 502 can be a single core processor, a multi-core processor, a computing cluster, or any number of other configurations. In some cases, the CPU 502 and other components of the node 500 may be implemented as a system on chip (SOC). Furthermore, the node 500 may include more than one CPU 502. The instructions that are executed by the CPU 502 may be used to enable the pooling of memory resources across multiple nodes.

The node 500 may also include a graphics processing unit (GPU) 504. As shown, the CPU 502 may be connected through a bus 506 to the GPU 504. However, in some embodiments, the CPU 502 and the GPU 504 are located on the same die. The GPU 504 may be configured to perform any number of graphics operations within the node 500. For example, the GPU 504 may be configured to render or manipulate graphics images, graphics frames, videos, or the like, to be displayed to a user of the node 500. In some cases, however, the node 500 does not include a GPU 504.

The CPU 502 may also be connected through the bus 506 to a CPU input/output (I/O). In embodiments, the CPU I/O 508 is used such that the CPU 502 can access pooled memory in a multi-node system. The CPU 502 can access the pooled memory without including dedicated memory within the node 500. Further, the CPU I/O 508 can access pooled memory within the multi-node system without the use of communication and networking protocols such as Transmission Control Protocol and Internet Protocol (TCP/IP) and InfiniBand (IB). In embodiments, a link such as a Plattsmouth (PLM) Link 510 is used to connect each node to a shared memory controller using memory semantics based protocols running on a serial link. A Peripheral Component Interconnect Express (PCIe) Link 512 may be used to connect the CPU 502 to a network.

The CPU 502 may also be connected through the bus 506 to an input/output (I/O) device interface 514 configured to connect the node 500 to one or more I/O devices 516. The I/O devices 516 may include, for example, a keyboard and a pointing device, wherein the pointing device may include a touchpad or a touchscreen, among others. The I/O devices 516 may be built-in components of the node 500, or may be devices that are externally connected to the node 500. The CPU 502 may also be linked through the bus 506 to a display interface 518 configured to connect the node 500 to display devices 520. The display devices 520 may include a display screen that is a built-in component of the node 500. The display devices 520 may also include a computer monitor, television, or projector, among others, that is externally connected to the node 500.

The block diagram of FIG. 5 is not intended to indicate that the node 500 is to include all of the components shown in FIG. 5. Further, the node 500 may include any number of additional components not shown in FIG. 5, depending on the details of the specific implementation. Moreover, the node 500 may include fewer components than those illustrated in FIG. 5. For example, the node 500 may not include a GPU 504, I/O device interface 514, or display interface 518.

The present techniques enable a cacheable global memory while maintaining independent fault domains. The global memory can be used to store shared data structures between different nodes (e.g., database) and also used for fast communication between nodes. If the shared memory is persistent (i.e., in non-volatile memory (NVM)), then the time to resume operations after a planned or un-planned node downtime and migration of tasks between nodes becomes very fast since the data is already in memory. Moreover, since the data consistency is enforced by software, there is an explicit handover of modified cacheable data which can be used to establish checkpoint to recover from if a node fails.

The present techniques also offer RAS features to enable memory and storage level resiliency. Moreover, in some embodiments, the memory may be a substitute for storage. If the memory is non-volatile memory, an entire database may be mapped from memory so that portions of the database are not uploaded from a disk or solid state drive (SSD). In this manner, time to access the database is decreased. In some cases, a next generation non-volatile memory has a large capacity that can substitute as storage but accessed using memory-type semantics. Moreover, the non-volatile memory described in the present techniques maintains the same resiliency of storage. The non-volatile memory can be replicated many times. In this manner, any RAID scheme can be implemented to provide a high level of reliability and fault isolation.

EXAMPLE 1

An apparatus for coherent shared memory across multiple clusters is provided herein. The apparatus includes a fabric memory controller, one or more nodes, and a global memory. The fabric memory controller manages access to a shared memory region of each node such that each shared memory region is accessible using load store semantics, even in response to failure of the node. Each shared memory region is mapped to the global memory by the fabric memory controller.

The fabric memory controller may be located within the one or more nodes. Additionally, the load store semantics enable communication between the one or more nodes. The fabric memory controller may also support memory replication, such that the global memory is accessible regards of the status of the one or more nodes. Further, the fabric memory controller may support all redundant array of independent disks (RAID) schemes across the global memory so that any portion of the global memory can be reconstructed in the event of a failure. The apparatus may include a backup fabric memory controller, wherein the backup fabric memory controller is used in the case of a failure of the first fabric memory controller. In response to a failure of the fabric memory controller, the contents of the failed fabric memory controller may be transferred to another fabric memory controller. Additionally, in response to a failure of a memory module attached to the fabric memory controller, the contents of the failed memory module may be transferred to another fabric memory controller or memory module.

EXAMPLE 2

A system for assisted coherent shared memory is described herein. The system includes a partially coherent memory and a fabric memory controller. The partially coherent memory includes a plurality of shared memory regions from a plurality of clusters while an independent fault domain of each cluster is maintained, and the fabric memory controller enables access to the partially coherent memory through load store semantics.

The plurality of shared memory regions may be accessed through a Plattsmouth link, networking stack, I/O stack, or any combination thereof. Further, the plurality of clusters can access data stored in the share memory regions and locally cache the data from the shared memory regions in a local cache. The clusters of the partially coherent memory may be connected using one or more enhanced networking interface controllers. Further, each node can maintain a local memory that is not directly accessible by other nodes. The shared memory region may be centralized, and the independent fault domain of each cluster may be maintained through a fault isolation boundary implemented by the fabric memory controller.

EXAMPLE 3

A method of coherent shared memory across multiple clusters is described herein. The method includes enabling a cacheable global memory using shared memory regions across multiple clusters, wherein the shared memory regions are accessible using load store semantics. The method also includes ensuring data coherency across the multiple clusters using a software assist mechanism. Further, the method includes maintaining independent fault domains for each cluster through the use of a fabric memory controller.

The fabric memory controller may be distributed through the multiple clusters. Additionally, the load store semantics can enable each cluster to communicate directly with another cluster. Further, a fault isolation boundary may enable the independent fault domains for each cluster.

In the preceding description, various aspects of the disclosed subject matter have been described. For purposes of explanation, specific numbers, systems and configurations were set forth in order to provide a thorough understanding of the subject matter. However, it is apparent to one skilled in the art having the benefit of this disclosure that the subject matter may be practiced without the specific details. In other instances, well-known features, components, or modules were omitted, simplified, combined, or split in order not to obscure the disclosed subject matter.

Various embodiments of the disclosed subject matter may be implemented in hardware, firmware, software, or combination thereof, and may be described by reference to or in conjunction with program code, such as instructions, functions, procedures, data structures, logic, application programs, design representations or formats for simulation, emulation, and fabrication of a design, which when accessed by a machine results in the machine performing tasks, defining abstract data types or low-level hardware contexts, or producing a result.

For simulations, program code may represent hardware using a hardware description language or another functional description language which essentially provides a model of how designed hardware is expected to perform. Program code may be assembly or machine language, or data that may be compiled and/or interpreted. Furthermore, it is common in the art to speak of software, in one form or another as taking an action or causing a result. Such expressions are merely a shorthand way of stating execution of program code by a processing system which causes a processor to perform an action or produce a result.

Program code may be stored in, for example, volatile and/or non-volatile memory, such as storage devices and/or an associated machine readable or machine accessible medium including solid-state memory, hard-drives, floppy-disks, optical storage, tapes, flash memory, memory sticks, digital video disks, digital versatile discs (DVDs), etc., as well as more exotic mediums such as machine-accessible biological state preserving storage. A machine readable medium may include any tangible mechanism for storing, transmitting, or receiving information in a form readable by a machine, such as antennas, optical fibers, communication interfaces, etc. Program code may be transmitted in the form of packets, serial data, parallel data, etc., and may be used in a compressed or encrypted format.

Program code may be implemented in programs executing on programmable machines such as mobile or stationary computers, personal digital assistants, set top boxes, cellular telephones and pagers, and other electronic devices, each including a processor, volatile and/or non-volatile memory readable by the processor, at least one input device and/or one or more output devices. Program code may be applied to the data entered using the input device to perform the described embodiments and to generate output information. The output information may be applied to one or more output devices. One of ordinary skill in the art may appreciate that embodiments of the disclosed subject matter can be practiced with various computer system configurations, including multiprocessor or multiple-core processor systems, minicomputers, mainframe computers, as well as pervasive or miniature computers or processors that may be embedded into virtually any device. Embodiments of the disclosed subject matter can also be practiced in distributed computing environments where tasks may be performed by remote processing devices that are linked through a communications network.

Although operations may be described as a sequential process, some of the operations may in fact be performed in parallel, concurrently, and/or in a distributed environment, and with program code stored locally and/or remotely for access by single or multi-processor machines. In addition, in some embodiments the order of operations may be rearranged without departing from the spirit of the disclosed subject matter. Program code may be used by or in conjunction with embedded controllers.

While the disclosed subject matter has been described with reference to illustrative embodiments, this description is not intended to be construed in a limiting sense. Various modifications of the illustrative embodiments, as well as other embodiments of the subject matter, which are apparent to persons skilled in the art to which the disclosed subject matter pertains are deemed to lie within the scope of the disclosed subject matter.

What is claimed is:

1. An apparatus for coherent shared memory across multiple clusters, comprising:
 a fabric memory controller;
 one or more nodes, wherein the fabric memory controller manages access to a shared memory region of each node such that each shared memory region is accessible using load store semantics, even in response to failure of the node; and
 a global memory, wherein each shared memory region is mapped to the global memory by the fabric memory controller.

2. The apparatus of claim 1, wherein the fabric memory controller is located within the one or more nodes.

3. The apparatus of claim 1, wherein the load store semantics enable communication between the one or more nodes.

4. The apparatus of claim 1, wherein the fabric memory controller supports memory replication, such that the global memory is accessible regards of the status of the one or more nodes.

5. The apparatus of claim 1, wherein the fabric memory controller supports all redundant array of independent disks (RAID) schemes across the global memory so that any portion of the global memory can be reconstructed in the event of a failure.

6. The apparatus of claim 1, wherein the apparatus includes a backup fabric memory controller, wherein the backup fabric memory controller is used in the case of a failure of the first fabric memory controller.

7. The apparatus of claim 1, wherein in response to a failure of the fabric memory controller, the contents of the failed fabric memory controller are transferred to another fabric memory controller.

8. The apparatus of claim 1, wherein in response to a failure of a memory module attached to the fabric memory controller, the contents of the failed memory module are transferred to another fabric memory controller or memory module.

9. A system for assisted coherent shared memory, comprising:
 a partially coherent memory, wherein the partially coherent memory includes a plurality of shared memory regions from a plurality of clusters while an independent fault domain of each cluster is maintained; and
 a fabric memory controller, wherein the fabric memory controller enables access to the partially coherent memory through load store semantics.

10. The system of claim 9, wherein the plurality of shared memory regions are accessed through a Plattsmouth link, networking stack, I/O stack, or any combination thereof.

11. The system of claim 9, wherein the plurality of clusters access data stored in the share memory regions and locally cache the data from the shared memory regions in a local cache.

12. The system of claim 9, wherein the clusters of the partially coherent memory are connected using one or more enhanced networking interface controllers.

13. The system of claim 9, wherein each node maintains a local memory that is not directly accessible by other nodes.

14. The system of claim 9, wherein the shared memory region is centralized.

15. The system of claim 9, wherein the independent fault domain of each cluster is maintained through a fault isolation boundary implemented by the fabric memory controller.

16. A method of coherent shared memory across multiple clusters, the method comprising:
 enabling a cacheable global memory using shared memory regions across multiple clusters, wherein the shared memory regions are accessible using load store semantics;
 ensuring data coherency across the multiple clusters using a software assist mechanism; and
 maintaining independent fault domains for each cluster through the use of a fabric memory controller.

17. The method of claim 16, wherein the fabric memory controller is distributed through the multiple clusters.

18. The method of claim 16, wherein the load store semantics enable each cluster to communicate directly with another cluster.

19. The method of claim 16, wherein a fault isolation boundary enables the independent fault domains for each cluster.

* * * * *